United States Patent
Cowham (10) Patent No.: US 8,341,704 B2
(45) Date of Patent: Dec. 25, 2012

(54) SECURE COMMUNICATION BETWEEN CLIENT DEVICE AND SERVER DEVICE

(75) Inventor: Adrian Cowham, Fair Oaks, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 651 days.

(21) Appl. No.: 12/610,226

(22) Filed: Oct. 30, 2009

(65) Prior Publication Data

US 2011/0107091 A1    May 5, 2011

(51) Int. Cl.
*H04L 29/00* (2006.01)
(52) U.S. Cl. ............... 726/3; 726/5; 726/6; 380/277
(58) Field of Classification Search .............. None
See application file for complete search history.

(56) References Cited

U.S. PATENT DOCUMENTS

| | | | |
|---|---|---|---|
| 7,290,040 B2 * | 10/2007 | Newcombe et al. | 709/217 |
| 7,693,976 B2 * | 4/2010 | Perry et al. | 709/223 |
| 8,201,219 B2 * | 6/2012 | Jones | 726/3 |
| 2004/0107272 A1 * | 6/2004 | Manukyan | 709/221 |
| 2006/0206922 A1 * | 9/2006 | Johnson et al. | 726/4 |

* cited by examiner

*Primary Examiner* — Minh Dinh

(57) ABSTRACT

A user is enabled to select one or more client devices from a number of client devices and to select one or more server devices from a number of server devices. Secure communication is to occur between each selected client device and each selected server device. For each unique pair of a selected client device and a selected server device, a validation of a security configuration of the selected client device and a security configuration of the selected server device is performed, to determine whether secure communication can occur between the selected client device and the selected server device. Where the validation has failed, reconfiguration of one or more of the selected client device and the selected server device is performed so that secure communication can occur between the selected client device and the selected server device.

19 Claims, 7 Drawing Sheets

FIG 5

SECURE COMMUNICATION BETWEEN CLIENT DEVICE AND SERVER DEVICE

BACKGROUND

The remote authentication dial in user service (RADIUS) networking protocol provides a way by which users of client computing devices can be authorized to access networking services. A user at a client computing device may submit credentials, such as a user name and password, to a RADIUS client device. The RADIUS client device in turn submits this information to a RADIUS server device using the RADIUS protocol, and the RADIUS server device may authorize the user or forward the information to another device for user authorization.

DETAILED DESCRIPTION

As noted in the background, the remote authentication dial in user service (RADIUS) networking protocol provides a way by which users of client computing devices can be authorized to access networking services. Communication between the RADIUS client device and the RADIUS server device is secure, for at least two reasons. First, the RADIUS client and server devices both have what is referred to as a shared secret, and which is used to encrypt communication between the two devices. Without knowledge of this shared secret, the communication between the RADIUS client and server devices cannot be easily compromised.

Second, the RADIUS server device a priori is configured with the identity of the RADIUS client device, such as the networking address of the RADIUS client device. The RADIUS server device will not respond to a RADIUS client device if it does not know the identity of this client device. Therefore, even if a RADIUS client device knows the shared secret, it cannot initiate the process to authorize a user if the RADIUS server device does not know the identity of the RADIUS client device. Conventionally, the RADIUS client device is referred to as a network authorization server (NAS), and the RADIUS server device is referred to as a RADIUS server.

In enterprise environments and other large-scale environments, there may be a relatively large number of RADIUS client devices with which users of client computing devices communicate to receive authorization. There may also be a relatively large number of RADIUS server devices, although typically lesser in number than the RADIUS client devices, for failover and load-balancing purposes. However, managing such large numbers of RADIUS client and server devices can become unwieldy.

For instance, it may be desirable for a given RADIUS client device to be able to access a subset of the RADIUS server devices, and thus for each RADIUS server device to accommodate a subset of the RADIUS client devices, for failover and load-balancing purposes. However, each unique pair of a given RADIUS client device and a given RADIUS server device is desirably associated with a unique shared secret that is different than the shared secret between the given RADIUS client device and any other RADIUS server device, and the shared secret between the given RADIUS server device and any other RADIUS client device. This is so that if one shared secret becomes compromised, just the communication between one RADIUS client device and one RADIUS server device is affected.

Current management approaches of RADIUS client and server devices is very labor intensive, however, which increases the chance for misconfiguration to occur, with potentially severe security implications or other side effects. A network administrator or other user has to manually enter the identity of each RADIUS client device and a shared key associated with this device into each RADIUS server device. The administrator also has to manually enter the identity of each RADIUS server device and a shared key associated with this device into each RADIUS client device.

However, if the network administrator or other user makes mistakes, RADIUS client devices may attempt to communicate with RADIUS server devices that do not know their identities, and the RADIUS server devices that do know the identities of these client devices may be underutilized. Furthermore, the administrator may not realize that each unique pair of a RADIUS client device and a RADIUS server device does not share a different shared secret. Therefore, if a given shared secret is compromised, the administrator may change the compromised shared secret for one pair of RADIUS client and server devices, but not for all pairs of RADIUS client and server devices that are associated with the same shared secret.

The inventor has developed an approach that overcomes these shortcomings. A network administrator or other user selects a number of RADIUS client devices and a number of RADIUS server devices. Secure communication is to occur between each selected client device and each selected server device. Moreover, in one embodiment, secure communication is not to occur between each selected client device and each unselected server device, and between each selected server device and each unselected client device.

For each unique pair of a selected RADIUS client device and a selected RADIUS server device, the security configuration of the selected client device and the security configuration of the selected server device are validated, to determine whether secure communication can occur between these two devices. For example, the shared key stored at the selected client device for communication with the selected server device may be compared against the shared key stored at the selected server device for communication with the selected client device to determine whether they are the same. As another example, the shared keys stored at the selected client and server devices for communication between these two devices may be compared against other shared keys to determine that they are unique.

If the validation that is performed has failed in any way, the selected RADIUS client device and/or the selected RADIUS server device is reconfigured to correct the failure. For example, if the shared key stored at the selected client device for communication with the selected server device is not identical to the shared key stored at the selected server device for communication with the selected client device, then either or both of these shared keys may be modified so that they match. As another example, if the shared keys stored at the selected client and server devices for communication between these two devices also are identical to other shared keys, then both of the shared keys may be modified so that they are not identical to other shared keys.

The inventive approach thus minimizes the amount of manual configuration that a network administrator or other user has to perform in relation to RADIUS client devices and RADIUS server devices. The administrator just has to select the client devices and the server devices between which secure communication is to occur. After this selection has been made, validation and reconfiguration are automatically performed with little or no further input on the part of the administrator. The administrator does not have to remember which shared keys have been used for which pairs of client devices and server devices to ensure that the shared keys are unique. Other types of misconfiguration are also detected during validation, and are corrected during reconfiguration.

It is noted that while embodiments of the present disclosure are described to large extent in relation to RADIUS client and server devices, other embodiments are applicable to ensuring secure communication between client and server devices that are not RADIUS client and server devices. For example, the RADIUS protocol uses a shared secret between a client device and a server device for communication between these two devices to be able to occur in a secure manner by encrypting the communication using the shared secret. However, in other embodiments, a different type of security token may be employed, other than a shared key, to provide for secure communication between a non-RADIUS client device and a non-RADIUS server device in a different manner altogether. Examples of other types of security tokens include public and private key pairs, digital certificates, passwords, and so on.

Figure 1:
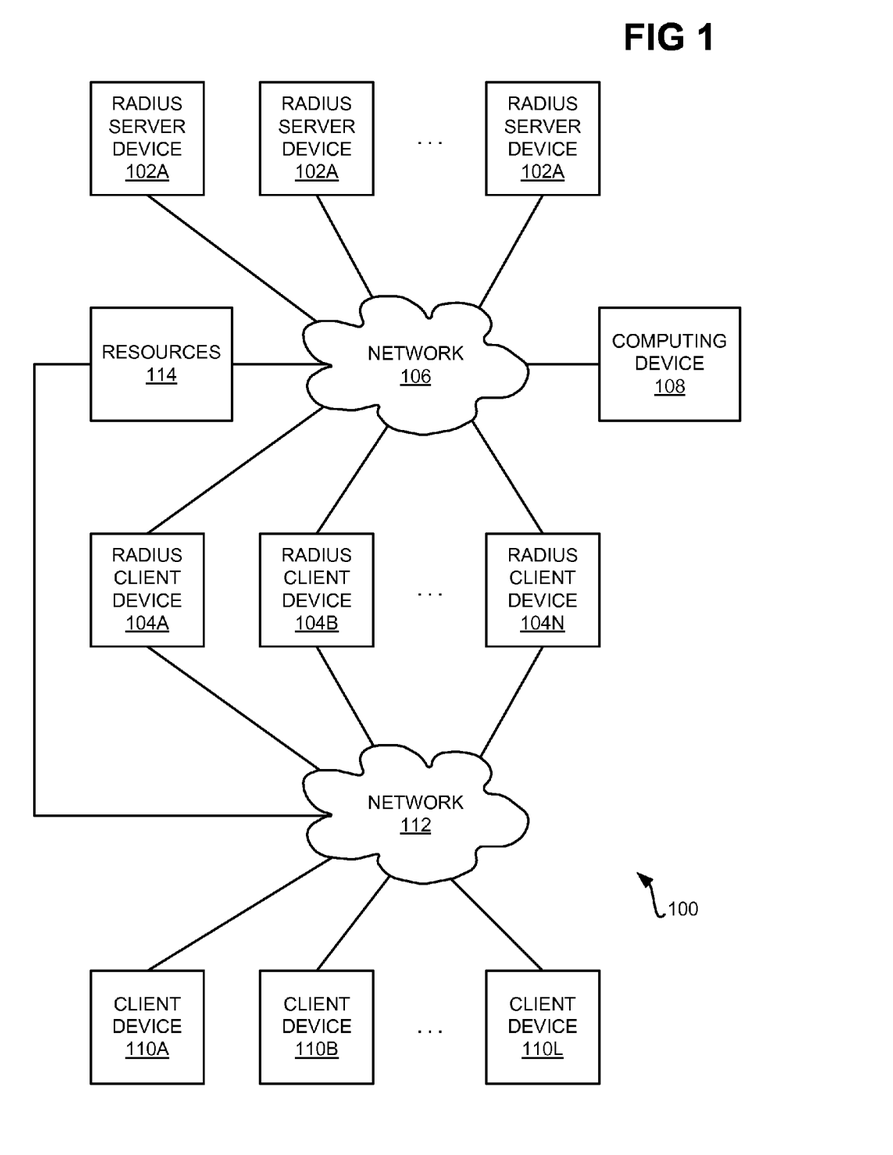
FIG. 1 is a diagram of a system of client devices and server devices, according to an embodiment of the present disclosure.

FIG. 1 shows a system 100, according to an embodiment of the disclosure. The system includes a number of RADIUS server devices 102A, 102B, . . . , 102M, collectively referred to as the RADIUS server devices 102, and a number of RADIUS client devices 104A, 104B, . . . , 104N, collectively referred to as the RADIUS client devices 104. There may be more client devices 104 than server devices 102. The server devices 102 are communicatively connected to the client devices 104 via a network 106, to which a computing device 108 and resources 114 are also communicatively connected. The RADIUS server device 102 and the RADIUS client devices 104 may each be a computing device, such as a computer, a networking device like a router, or another type of device.

The RADIUS client devices 104 are communicatively connected to a number of client devices 110A, 110B, . . . , 110L, collectively referred to as the client devices 110. The client devices 110 may be computing devices, such as computers, smartphone devices having networking capability, or other types of computing devices. End users use the client devices 110 to ultimately access the resources 114, which may be web servers, other types of servers, or other types of resources. The resources 114 may be communicatively connected to the network 112 in addition to the network 106. In some embodiments, the resources 114 may be communicatively connected just to the network 106, in which case the client devices 110 access the resources 114 through the client devices 104. Furthermore, in some embodiments, there may be just one network, instead of two networks 106 and 112 as depicted in FIG. 1.

In general operation, users at the client devices 110 enter their credentials, such as their user names and associated passwords, for accessing the resources 114. Each client device 110 transmit credentials over the network 112 to the one of the RADIUS client devices 104. The client device 104 that receives this information securely communicates with one of the RADIUS server devices 102. The server device 102 that receives this information determines whether the credentials are valid, or forwards the information to a different device for user authorization to occur.

Assuming that the credentials are valid, the RADIUS server device 102 securely communicates back to the RADIUS client device 104 that the user in question has been authorized, which in turn informs the client device 110 that this user has been authorized. The user then can use the client device 110 to access the resources 114. The client device 110 accesses the resources 114 either through the network 112 without passing through the RADIUS client device 104, or through the network 112, through the RADIUS client device 104, and through the network 106.

Secure communication between a RADIUS client device 104 and a RADIUS server device 102 in the context of the RADIUS networking protocol means that communication between the devices 102 and 104 is encrypted using the shared secret with which this pair of devices 102 and 104 is associated. As noted above, however, if a client device 104 is not listed at a server device 102, the client device 104 will not be able to securely communicate with the server device 102 even if the client device 104 has a shared secret known to the server device 102. This is because the server device 102 will not respond to communication from a client device 104, even if it is encrypted with a shared secret known to the server device 102, if the server device 102 does not recognize the client device 104 in question.

The computing device 108 validates the configurations of the RADIUS server devices 102 and the RADIUS client devices 104 to determine whether secure communication can occur between selected server devices 102 and selected client devices 104 as desired. If validation fails, then the computing device 108 reconfigures the selected server devices 102 and/or the selected client devices 104 so that secure communication can occur between the selected server devices 102 and the selected client devices 104. The computing device 108 may be an external computing device, as depicted in FIG. 1, or may alternative be one of the server devices 102 or one of the client devices 104.

Figure 2:
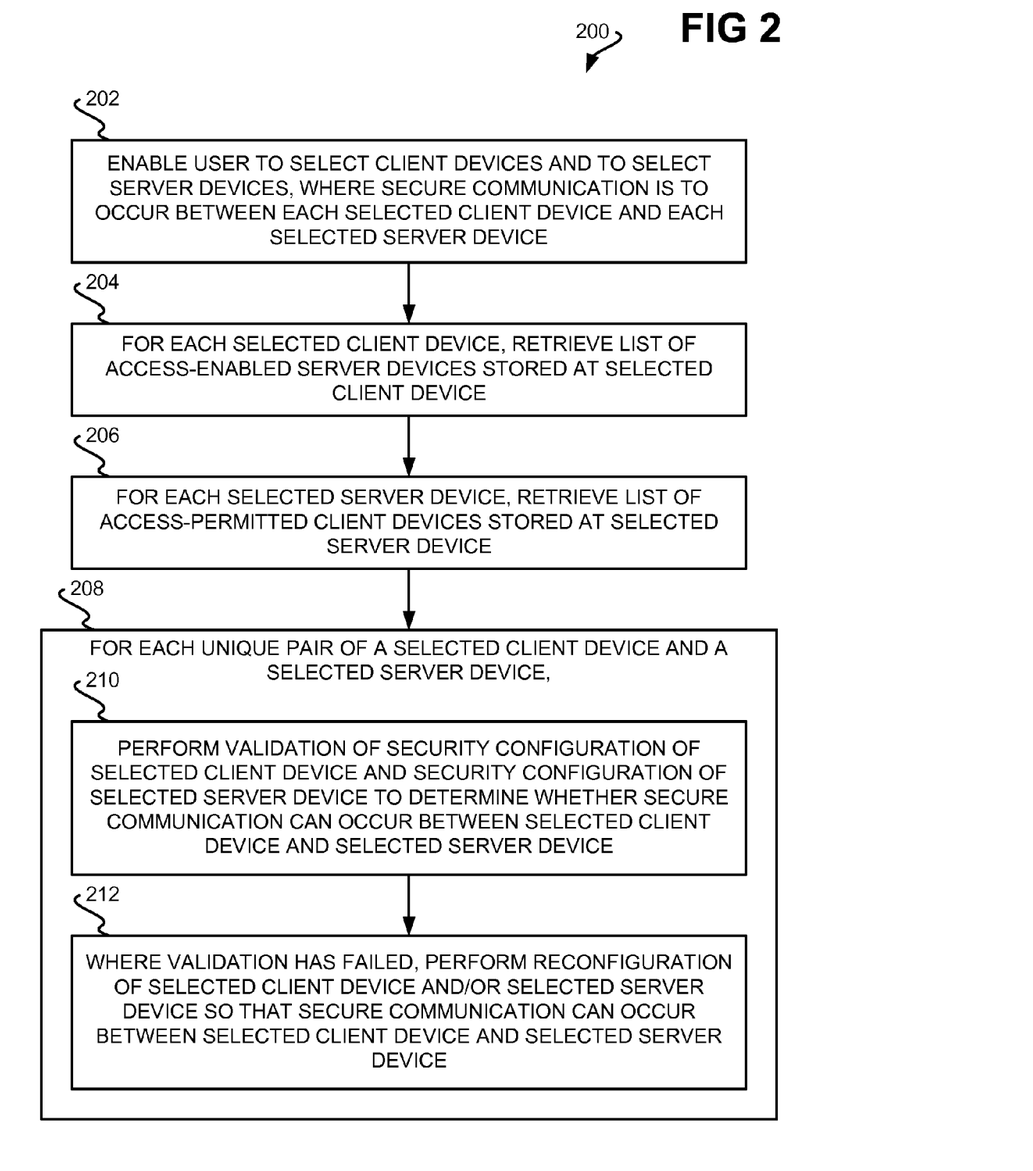
FIG. 2 is a flowchart of a method for ensuring that selected client devices can securely communicate with selected server devices, according to an embodiment of the present disclosure.

FIG. 2 shows a method 200 for ensuring that selected RADIUS client devices can communicate with selected RADIUS server devices, according to an embodiment of the disclosure. The method 200 may be performed by the computing device 108, for instance, such as by a processor of the computing device 108. The user is enabled to select client devices and to select server devices (202). The user selects the client and server devices in that secure communication is to occur between each selected client device and each selected server device. In one embodiment, the user further selects the client and server devices in that secure communication is not to occur between each selected client device and each unselected server device, and between each selected server device and each unselected client device.

In one embodiment, a graphical user interface is presented by which the user selects the RADIUS client devices and the RADIUS server devices. For example, a list of N client devices and a list of M server devices may be displayed, as icons and/or by the names of the devices. The user may select up to N client devices and up to M server devices within the graphical user interface.

For each selected RADIUS client device, a list of access-enabled RADIUS server devices stored at the selected client device is retrieved from the selected client device (204). For a given client device, the access-enabled server devices are those server devices with which secure communication is to, and ideally can, occur. Similarly, for each selected server device, a list of access-permitted client devices stored at the selected server device is retrieved from the selected server device. For a given server device, the access-permitted client devices are those client device with which secure communication is to, and ideally can, occur.

Figure 3A:
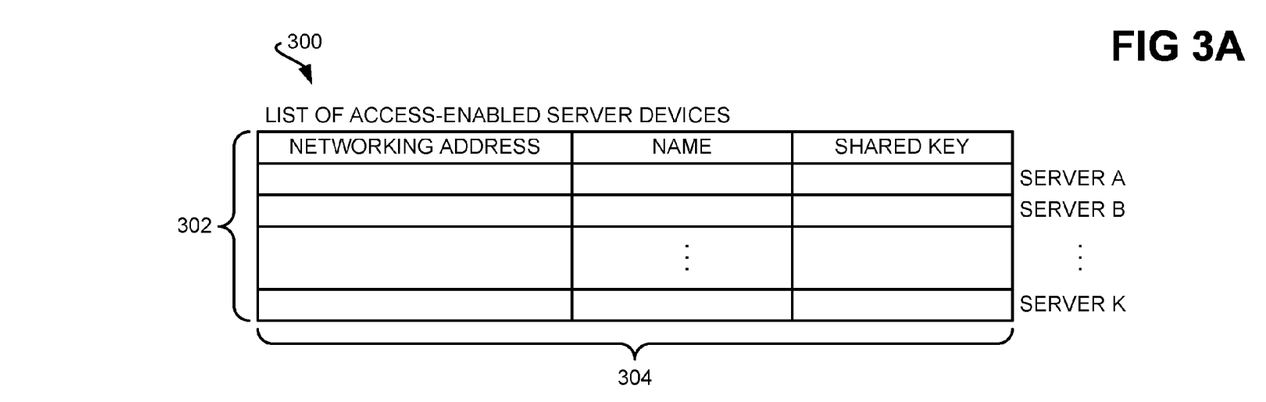
FIGS. 3A and 3B are diagrams of lists of access-enabled server devices and access-permitted client devices, respectively, according to an embodiment of the present disclosure.

FIG. 3A shows a representative list 300 of access-enabled server devices that may be stored at a selected client device, according to an embodiment of the disclosure. The terminology "list" is used herein in a general and all-encompassing sense, to referring to any type of data structure or database that stores information for a number of access-enabled server devices. The list 300 includes a number of rows 302, which correspond to the K server devices with which secure communication is to occur by the selected client device in question, where K is greater than or equal to zero. The list includes a number of columns 304, corresponding to the information that is stored for each access-enabled server device. The information stored in the list 300 may include other information, in addition to and/or in lieu of that depicted in FIG. 3A.

The information stored for each access-enabled RADIUS server device includes a network addressing, such as an Internet protocol (IP) and/or a media access controller (MAC) address, which uniquely identifies the access-enabled server device on a network. The information also includes a name, which may be referred to as a "friendly name," and which in easy to understand words describes an access-enabled server device. For example, the name may be "server 54 on third floor of building B," so that the user can easily discern the identity of a server device. Finally, the information includes a shared key that the selected RADIUS client device to which the list 300 corresponds uses to encrypt communication with an access-enabled server device.

Figure 3B:
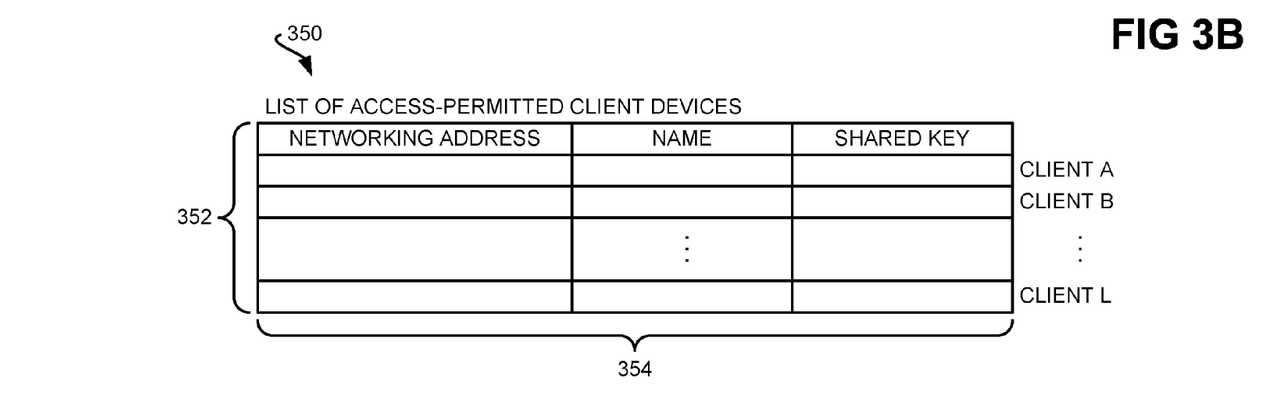

FIG. 3B shows a representative list 350 of access-permitted RADIUS client devices that may be stored at a selected RADIUS server device, according to an embodiment of the disclosure. The list 350 includes a number of rows 352, which correspond to the L client devices with which secure communication is to occur by the selected server device in question, where L is greater than or equal to zero. This list includes a number of columns 354, corresponding to the information that is stored for each access-permitted client device. The information stored in the list 350 may include other information, in addition to and/or in lieu of that depicted in FIG. 3B.

The information stored for each access-permitted RADIUS client device includes a network addressing, such as an IP and/or a MAC address, which uniquely identifies the access-permitted client device on a network. The information also includes a name, which may be referred to as a "friendly name," and which in easy to understand words describes an access-permitted client device. Finally, the information includes a shared key that the selected RADIUS server device to which the list 350 corresponds uses to encrypt communication with an access-permitted client device.

Referring back to FIG. 2, once the lists have been retrieved in parts 204 and 206, parts 210 and 212 are performed for each unique pair of a selected RADIUS client device and a selected RADIUS server device (208). For example, if client devices A, C, and D (out of clients A-J) are selected, and server devices 1 and 5 are selected (out of clients 1-5), then there are six unique client device-server device pairs. These six unique pairs are: client device A-server device 1; client device C-server device 1; client device D-server device 1; client device A-server device 5; client device C-server device 5; and, client device D-server device 5.

The security configuration of the selected RADIUS client device of a unique pair and the security configuration of the selected RADIUS server device of the unique pair are validated (210), to determine whether secure communication can occur between the selected client device and the selected server device. Validation is performed using the lists that were retrieved in parts 204 and 206, in that the information contained within these lists is validated. The security configuration of the selected client device includes the networking address, name, and/or shared key that the selected client device has listed for the selected server device. Likewise, the security configuration of the selected server device includes the networking address, name, and/or shared key that the selected server device has listed for the selected client device. The security configuration of the selected client device has to be consistent with the security configuration of the selected server device for secure communication to be able to occur between these two devices.

If validation has failed, then the selected RADIUS client device and/or the selected RADIUS server device are reconfigured so that secure communication can occur between these two devices (212). Validation has failed when the security configuration of the selected client device and the security configuration of the selected server device are inconsistent with one another such that secure communication between the selected client and server devices cannot occur. The selected client device and/or the selected server device are reconfigured in that the security configuration of the client device and/or the security configuration of the server device are modified so that they become consistent with one another. Reconfiguration is performed using the lists that were retrieved in parts 204 and 206, in that the information contained within these lists is added to or modified.

As described above, the RADIUS client devices and the RADIUS server devices may be selected by the user not for secure communication to occur between each selected client device and each selected server device. However, the client and server devices may also be selected by the user so that secure communication is not to occur between each selected client device and each unselected server device or between each selected server device and each unselected client device. In such an embodiment, the reconfiguration of part 210 and the validation of part 212 are performed also so that the selected client device in question cannot securely communicate with any unselected server device, and so that the selected server device in question cannot securely communicate with any unselected client device. In this embodiment, lists for all client devices and server devices may be retrieved in parts 204 and 206, including the lists for unselected client devices and unselected server devices, and not just the lists for the selected client devices and the selected server devices.

Figure 4A:
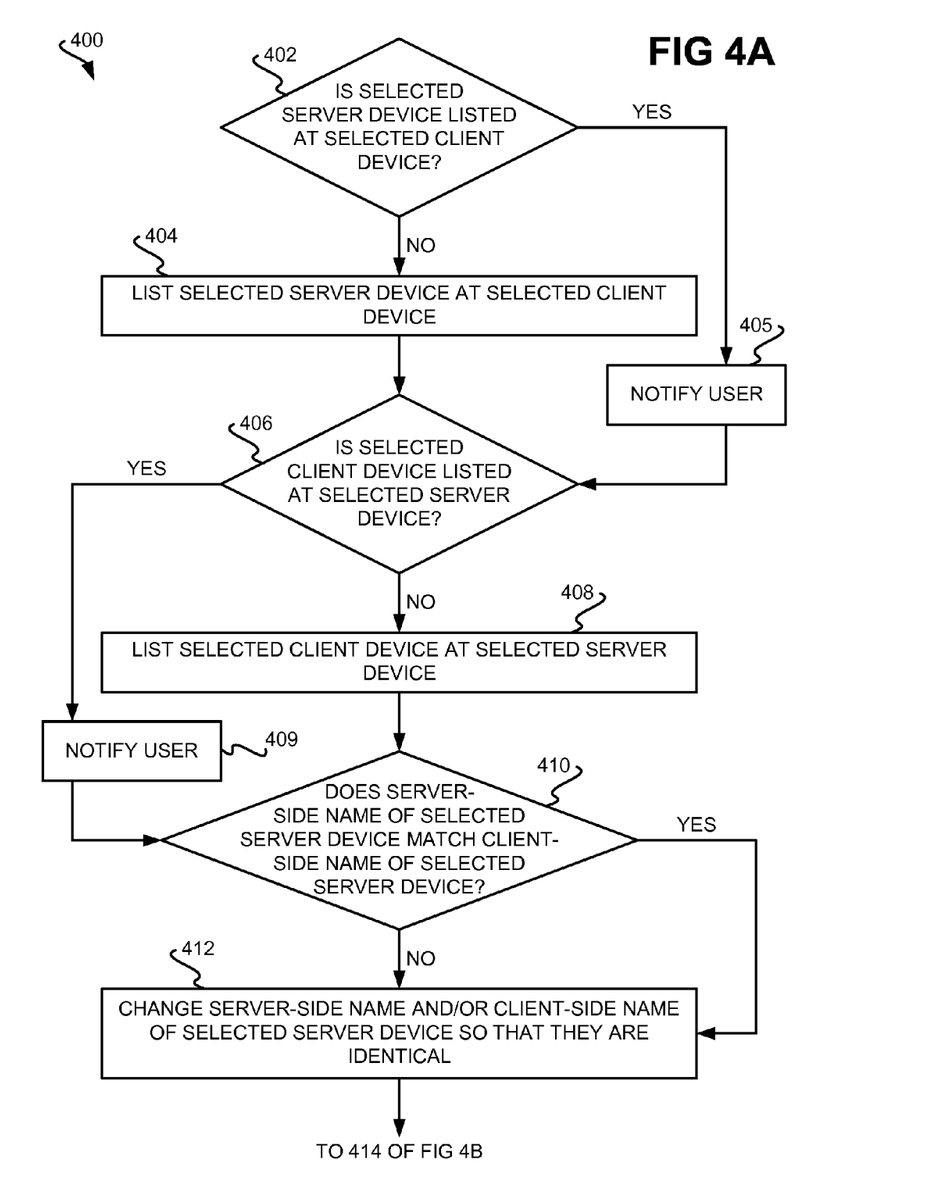
FIGS. 4A, 4B, and 4C are flowcharts of a method for performing validation and reconfiguration of a selected client device-selected server device pair, according to an embodiment of the present disclosure.
Figure 4B:
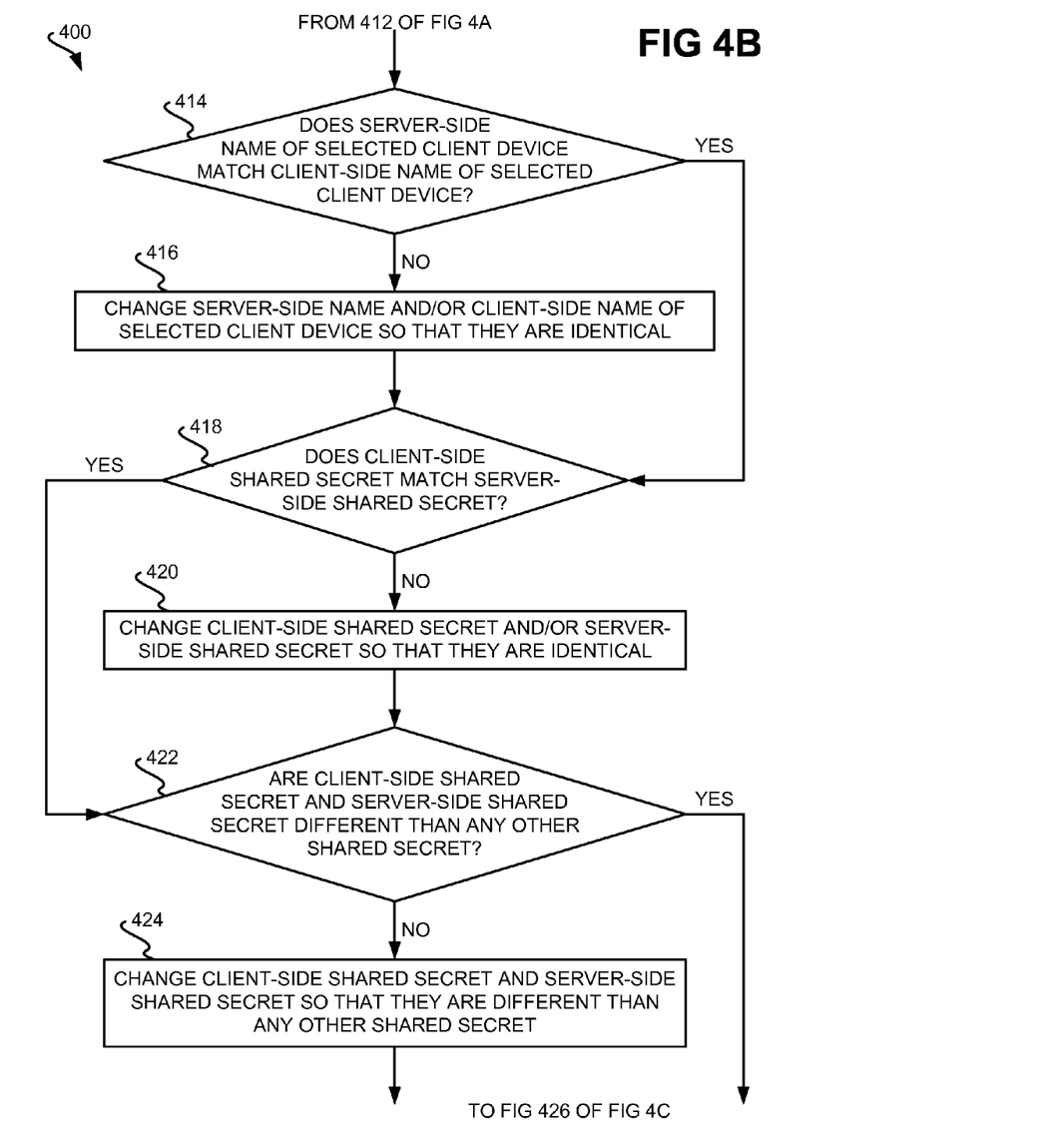
Figure 4C:
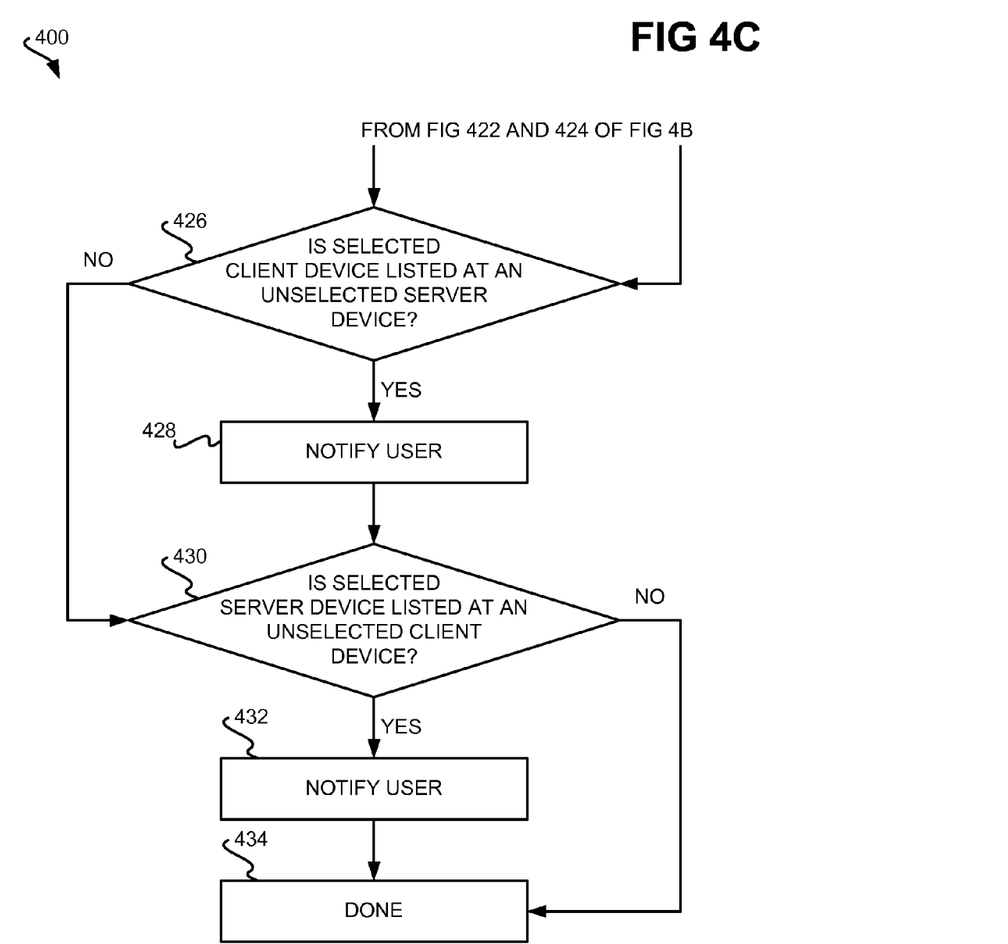

FIGS. 4A, 4B, and 4C show a method 400 that can implement the validation and the reconfiguration of parts 210 and 212 of the method 200, according to an embodiment of the disclosure. The method 400 is thus a specific implementation of how validation can be performed in part 210, and how reconfiguration can then be performed in part 212 where the validation has failed. As with the method 200, the method 400 may be performed by the computing device 108 of FIG. 1, such as by a processor of the computing device 108. The method 400 is described in relation to a unique pair of a selected server device and a selected client device. The method 400 is performed for each such unique pair.

If the selected server device is not listed at the selected client device (402), then the selected server device is listed at the selected client device (404). Whether the selected server device is listed at the selected client device is determined by looking up the networking address of the selected server device within the selected client device's list 300 of access-enabled server devices. The selected server device's networking address and name may then be added to the selected client devices' list 300 if it is not present within the list 300. It is also noted that the selected client device may already be listed in the selected server device's list 350 of access-permitted client devices when part 402 is performed. In this case, the selected server device's shared key for the selected client device may be copied from the selected server device's list 350 to the selected client device's list 300 in part 404.

If the selected server device is already listed at the selected client device (402), however, then the user may be notified (405). Such notification may be useful if the user would like to know whether the selected client device has previously been attempted to have been configured so that the selected client device can communicate with the selected server device. It is known that the selected client device may have previously been attempted to have been configured so that the selected client device can communicate with the selected server device where the selected server device is already listed at the selected client device.

If the selected client device is not listed at the selected server device (406), then the selected client device is listed at the selected server device (408). Whether the selected client device is listed at the selected server device is determined by looking up the networking address of the selected client device within the selected server device's list 350 of access-permitted client devices. The selected client device's networking address and name may be added to the selected server device's list 350 if it is not present within the list 350. It is noted that the selected server device may already be listed in the selected client device's list 300 of access-enabled server devices when part 406 is performed. In this case, the selected client device's shared key for the selected server device may be copied from the selected client device's list 300 to the selected server device's list 350 in part 408.

If the selected client device is already listed at the selected server device (406), however, then the user may be notified (409). Such notification may be useful if the user would like to know whether the selected server device has previously been attempted to have been configured so that the selected client device can communicate with the selected server device. It is known that the selected server device may have previously been attempted to have been configured so that the selected client device can communicate with the selected server device where the selected client device is already listed at the selected server device.

If the server-side name of the selected server device does not match the client-side name of the selected server device (410), then the server-side name and/or the client-side name are changed so that they are identical (412). The name of the selected server device is the name by which the user identifies the selected server device. The server-side name of the selected server device is this name of the selected server device as stored at the selected server device, whereas the client-side name of the selected server device is this name of the selected server device (i.e., of itself) as listed at the selected client device. For example, the server-side name of the selected server device may be "server 54 on third floor of building B," whereas the client-side name of the selected server device may be "server 54 on second floor of building B." In this case, the user is notified of the inconsistency, and given the opportunity to change either the server-side name or the client-side name.

Similarly, if the server-side name of the selected client device does not match the client-side name of the selected client device (414), then the server-side name and/or the client-side name are changed so that they are identical (416). The name of the selected client device is the name by which the user identifies the selected client device. The server-side name of the selected client device is this name of the selected client device as listed at the selected server device, whereas the client-side name of the selected client device (i.e., of itself) is this name of the selected client device as stored at the selected client device. For example, the server-side name of the selected client device may be "NAS 72 in building 3," whereas the client-side name of the selected client device may be "NAS 65 in building 7." In this case, the user is notified of the inconsistency, and given the opportunity to change either the server-side name or the client-side name.

If the client-side shared secret does not match the server-side shared secret (418), then the client-side shared secret and/or the server-side shared secret are changed so that they are identical (420). The client-side shared secret is the shared secret that is listed at the selected client device for secure communication with the selected server device (i.e., for the selected server device). The server-side shared secret is the shared secret that is listed at the selected server device for secure communication with the selected client device (i.e., for the selected client device). For secure communication to occur between the selected client device and the selected server device, however, the client-side and the server-side shared secrets have to be identical. This is because when the selected client device encrypts information intended for the selected server device using the shared secret, the selected server device has to use the same shared key to decrypt the information, and vice-versa.

It is noted, however, that for security tokens more generally, the client-side security token just has to match—and not be identical to—the server-side security token for secure communication to be able to occur between the selected client device and the selected server device. For example, in public key-private key encryption, the client-side security token includes the client device's private key and the server device's public key, and the server-side security token includes the server device's private key and the client device's public key. The client device encrypts information sent to the server device using the server device's public key, and the server device decrypts this information using its private key. Similarly, the server device encrypts information sent to the client device using the client device's public key, and the client device decrypts this information using its private key.

That the client-side shared secret is not identical to and does not match the server-side shared secret can include either or both of these shared secrets being missing. That is, the client-side shared secret may be missing in that the selected client device does not have any shared secret listed for the selected server device. Likewise, the server-side shared secret may be missing in that the selected server device does not have any shared secret listed for the selected client device. Where either or both of the client-side and the server-side shared keys are missing, it is thus said that the client-side shared key is not identical to and does not match the server-side shared key.

When the client-side shared secret does not match and is not identical to the server-side shared secret, the user may be notified, and given an opportunity to change either or both shared secrets. For example, if the client-side shared secret is A and the server-side shared secret is B, then the user may change the client-side shared secret to B, the server-side shared secret to A, or both the client-side and the server-side shared secrets to something other than A and B. In one embodiment, the client-side shared secret and the server-side shared secret may both be set to a computer-generated shared secret that is sufficiently long and complex to resist guessing, brute-force attacks, and dictionary attacks. The user may be given the opportunity to review this shared secret, or the client-side and the server-side shared secrets may be set without providing the user with a review opportunity.

If the client-side shared secret and the server-side shared secret match a shared secret maintained by a different client device or by a different server device (422), then the client-side shared secret and the server-side shared secret are both changed so that they are different than the other shared secret maintained by the different client or server device (424), while still being identical to one another. The client-side shared secret and the server-side shared secret have to be identical so that the selected client device and the selected server device can communicate with one another. However, for added security, the client-side shared secret and the server-side shared secret are desirably different than any other shared secret maintained by any other client or server device. This is so that if a given shared secret is compromised, just one client device-server device pair is affected, and not any other client device-server device pair.

To determine whether the shared secret maintained server-side and client-side are different than any other shared secret, the lists of access-enabled server devices maintained by unselected client devices—in addition to those lists maintained by selected client devices—have to have be retrieved in part 204 of FIG. 2. Likewise, the lists of access-permitted client devices maintained by unselected server devices—in addition to those lists maintained by selected server devices—have to have been retrieved in part 206 of FIG. 2. Retrieval of these lists permits the determination to be made as to whether the shared secret maintained by the selected server device and by the selected client device in relation to which the method 400 is being performed is different than any other shared secret—regardless of whether the shared secrets are maintained by a selected or an unselected client or server device—because the other shared secrets are stored in these lists.

If the selected client device is listed at an unselected server device (426), then the user is notified of this (428). If the selected client device is present within the list of access-permitted client devices at an unselected server device, then this means that the selected client device may be able to securely communicate with an unselected server device. However, the user may just wish for the selected client device to communicate with the selected server devices, and not with any server device that has not been selected. Therefore, the user is notified, and may be given the opportunity to select the currently unselected server device.

The user may also be given the opportunity to remove the selected client device from the list of access-permitted client devices at the unselected server device, as well as to remove the unselected server device from the list of access-enabled server devices at the selected client device, if present. In this way, the user can ensure that the selected client device is not able to communicate with any unselected server devices. To determine whether the selected client device is listed at an unselected server device, the lists of access-permitted client devices maintained by the unselected server devices have to have been retrieved in part 206 of FIG. 2.

Likewise, if the selected server device is listed at an unselected client device (430), then the user is notified of this (432). If the selected server device is presented within the list of access-enabled server devices at an unselected client device, then this means that the selected server device may be able to securely communicate with an unselected client device. However, the user may just wish for the selected server device to communicate with the selected client devices, and not with any client device that has not been selected. Therefore, the user is notified, and may be given the opportunity to select the currently unselected client device.

The user may also be given the opportunity to remove the selected server device from the list of access-enabled server devices at the unselected client device, as well as to remove the unselected client device from the list of access-permitted client devices at the selected server device, if present. In this way, the user can ensure that the selected server device is not able to communicate with any unselected client devices. To determine whether the selected server device is listed at an unselected client device, the lists of access-enabled server devices maintained by the unselected client devices have to have been retrieved in part 204 of FIG. 2.

In this way, the user is afforded the opportunity to ensure that secure communication cannot occur between the selected client device and any unselected server device, and that secure communication cannot occur between the selected server device and any unselected client device. That is, the user selects server devices and client devices in part 202 of FIG. 2 at least to ensure that the selected server devices can securely communicate with the selected client devices. However, the user may select server devices and client devices in part 202 to also ensure that the selected server devices cannot securely communicate with unselected client devices, and that the selected client devices cannot securely communicate with unselected server devices. In any case, the method 400 ultimately concludes at part 430.

Figure 5:
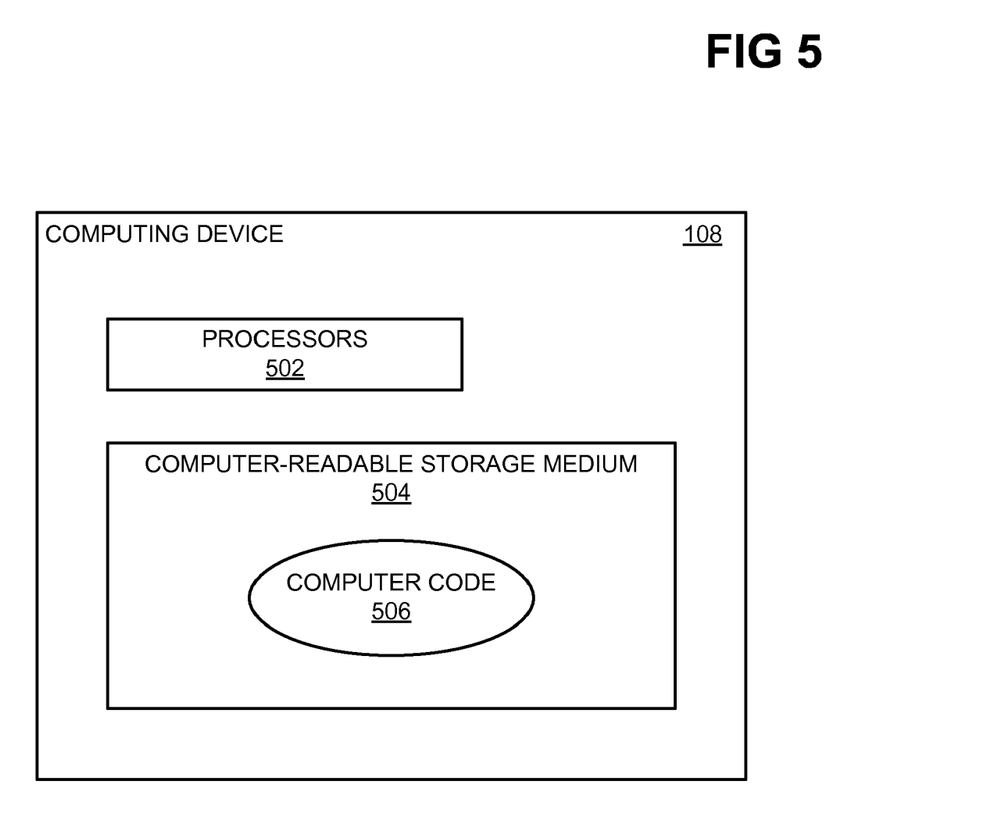
FIG. 5 is a diagram of a rudimentary computing device, according to an embodiment of the disclosure.

In conclusion, FIG. 5 shows the computing device 108 in rudimentary detail, according to an embodiment of the disclosure. The computing device 108 is depicted in FIG. 5 as including one or more processors 502 and a computer-readable storage medium 504. The computer-readable storage medium 504 may be a volatile storage medium like dynamic-random access memory, a non-volatile storage medium like a hard disk drive, or another type of computer-readable storage medium. The computing device 108 may also include other components, in addition to those depicted in FIG. 5.

The computer-readable storage medium 504 stores computer code 506. The computer code 506 is executed by the processors 502. Execution of the computer code 506 by the processors 502 causes a method to be performed. For example, the method can be the method 200 of FIG. 2 and/or the method 400 of FIGS. 4A, 4B, and 4C that have been described. As such, the computer code 506 permits a user to select RADIUS server devices and RADIUS client devices. The computer code 506 validates the security configurations of these selected server and client devices, and reconfigures them where validation fails, so that each selected client device is able to securely communicate with each selected server device.

We claim:

1. A method comprising:
   enabling a user, by a processor of a computing device, to select client devices from a plurality of client devices and to select server devices from a plurality of server devices, where secure communication is to occur between each selected client device and each selected server device;
   for each unique pair of a selected client device and a selected server device, performing a validation of a security configuration of the selected client device and a security configuration of the selected server device, by the processor of the computing device, to determine whether secure communication can occur between the selected client device and the selected server device; and, where the validation has failed, performing reconfiguration of one or more of the selected client device and the selected server device so that secure communication can occur between the selected client device and the selected server device.

2. The method of claim 1, wherein the validation is performed to further determine whether secure communication can occur between each selected client device and each unselected server device and between each unselected client device and each selected server device, and wherein the reconfiguration is performed further so that secure communication is not to occur and cannot occur between each selected client device and each unselected server device and between each unselected client device and each selected server device.

3. The method of claim 1, further comprising, for each unique pair of a selected client device and a selected server device:

retrieving a first list of access-enabled server devices stored at the selected client device, by the processor of the computing device; and, retrieving a second list of access-permitted client devices stored at the selected server device, by the processor of the computing device, wherein the validation is performed using the first list and the second list.

4. The method of claim 1, wherein the user is enabled to select the one or more client devices and the one or more server devices via a graphical user interface (GUI) presented by the processor of the computing device.

5. The method of claim 1, wherein performing the validation comprises determining that the selected server device is not listed at the selected client device, by looking up a networking address of the selected server device, and wherein performing the reconfiguration comprises listing the selected server device at the selected client device.

6. The method of claim 1, wherein performing the validation comprises determining that the selected client device is not listed at the selected server device, by looking up a networking address of the selected client device, and wherein performing the reconfiguration comprises listing the selected client device at the selected server device.

7. The method of claim 1, wherein performing the validation comprises determining that the selected server device is already listed at the selected client device, by looking up a networking address of the selected server device, and wherein performing the reconfiguration comprises notifying a user that the selected server device is already listed at the selected client device.

8. The method of claim 1, wherein performing the validation comprises determining that the selected client device is already listed at the selected server device, by looking up a networking address of the selected client device, and wherein performing the reconfiguration comprises notifying a user that the selected client device is already listed at the selected server device.

9. The method of claim 1, wherein performing the validation comprises determining that a client-side security token that the selected client device has for the selected server device does not match a server-side security token that the selected server device has for the selected client device, and wherein performing the reconfiguration comprises changing one or more of the server-side security token and the client-side security token such that the server-side security token matches the client-side security token, and wherein the client-side security token and the server-side security token are used to encrypt the communication between the selected client device and the selected server device.

10. The method of claim 1, wherein performing the validation comprises determining that a client-side security token that the selected client device has for the selected server device and that a server-side security token that the selected server device has for the selected client device match a security token maintained by a different client device or a different server device, and wherein performing the reconfiguration comprises changing the server-side security token and the client-side security token such that the server-side security token and the client-side security token are different than the security token maintained by the different client device or the different server device.

11. The method of claim 1, wherein performing the validation comprises determining that a server-side name by which a user identifies the selected server device does not match a client-side name by which the user identifies the selected server device, and wherein performing the reconfiguration comprises changing one or more of the server-side name and the client-side name so that the server-side name and the client-side name are identical.

12. The method of claim 1, wherein performing the validation comprises determining that a client-side name by which a user identifies the selected client device does not match a server-side name by which the user identifies the selected client device, and wherein performing the reconfiguration comprises changing one or more of the server-side name and the client-side name so that the server-side name and the client-side name are identical.

13. The method of claim 1, wherein performing the validation comprises determining that the selected client device is listed at an unselected server device, and wherein performing the reconfiguration comprises notifying a user that the selected client device is listed at the unselected server device.

14. The method of claim 1, wherein performing the validation comprises determining that the selected server device is listed at an unselected client device, and wherein performing the reconfiguration comprises notifying a user that the selected server device is listed at the unselected client device.

15. The method of claim 1, wherein the client devices are remote authentication dial in user service (RADIUS) networking protocol client devices, and the server devices are RADIUS networking protocol server devices.

16. A computing device comprising:
a processor;
a computer-readable storage medium;
computer code stored on the computer-readable storage medium and executed by the processor to:
enable a user to select one or more client devices from a plurality of client devices and to select one or more server devices from a plurality of server devices, where secure communication is to occur between each selected client device and each selected server device;

for each unique pair of a selected client device and a selected server device, perform a validation of a security configuration of the selected client device and a security configuration of the selected server device, by the processor of the computing device, to determine whether secure communication can occur between the selected client device and the selected server device; and, where the validation has failed, perform reconfiguration of one or more of the selected client device and the selected server device so that secure communication can occur between the selected client device and the selected server device.

17. The computing device of claim 16, wherein the client devices are remote authentication dial in user service (RADIUS) networking protocol client devices, and the server devices are RADIUS networking protocol server devices.

18. A non-transitory, computer-readable storage medium having computer code stored thereon, wherein execution of the computer code by a processing of a computing device causes a method to be performed, the method comprising:

enabling a user, by a processor of a computing device, to select one or more client devices from a plurality of client devices and to select one or more server devices from a plurality of server devices, where secure communication is to occur between each selected client device and each selected server device;

for each unique pair of a selected client device and a selected server device, performing a validation of a security configuration of the selected client device and a security configuration of the selected server device, by the processor of the computing device, to determine whether secure communication can occur between the selected client device and the selected server device; and, where the validation has failed, performing reconfiguration of one or more of the selected client device and the selected server device so that secure communication can occur between the selected client device and the selected server device.

19. The non-transitory, computer-readable storage medium of claim 18, wherein the client devices are remote authentication dial in user service (RADIUS) networking protocol client devices, and the server devices are RADIUS networking protocol server devices.

* * * * *